Feb. 23, 1943.  C. C. WILLIAMS  2,312,057
MECHANICAL MOVEMENT
Filed Oct. 27, 1941  2 Sheets-Sheet 2
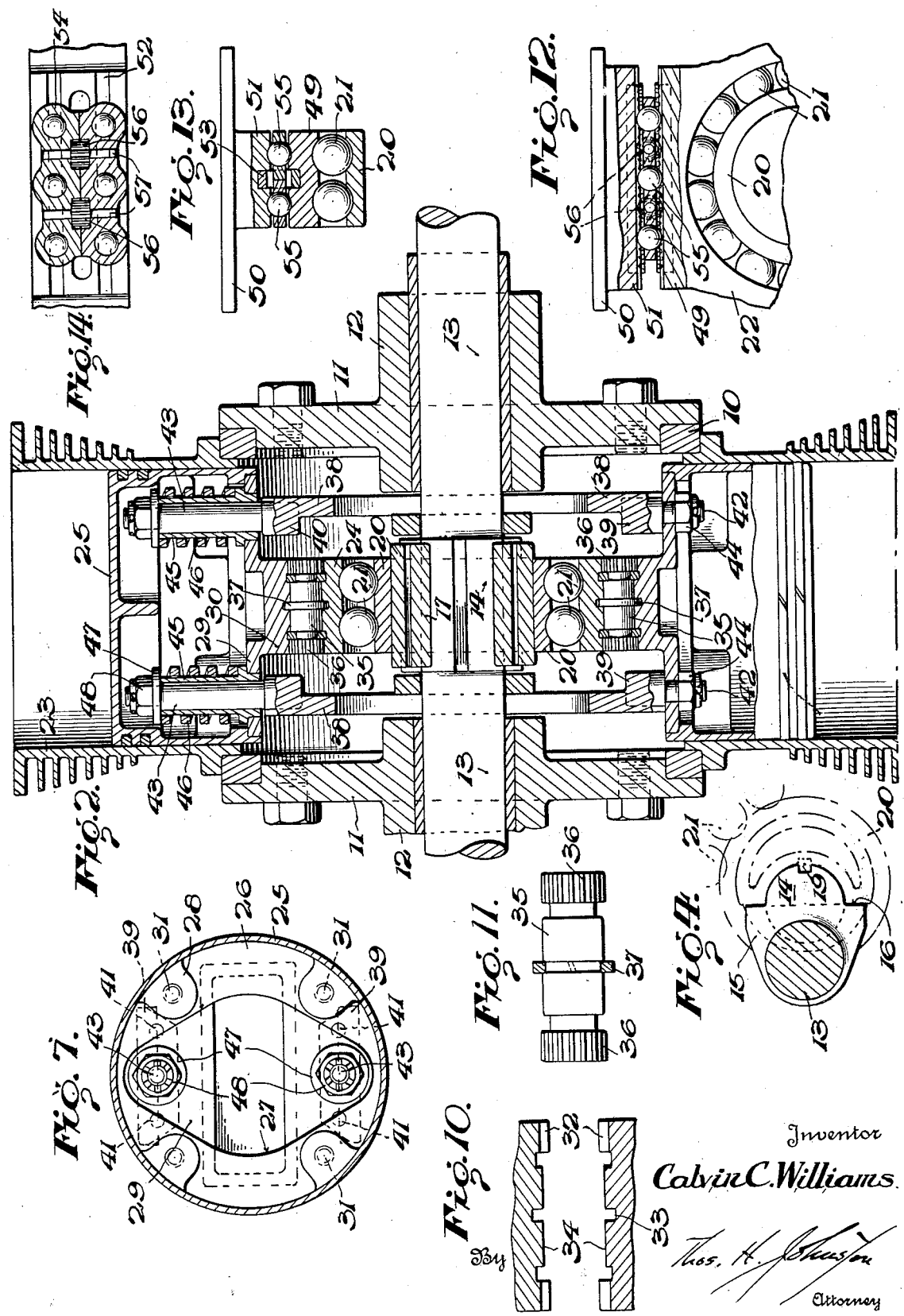
Inventor
Calvin C. Williams Patented Feb. 23, 1943

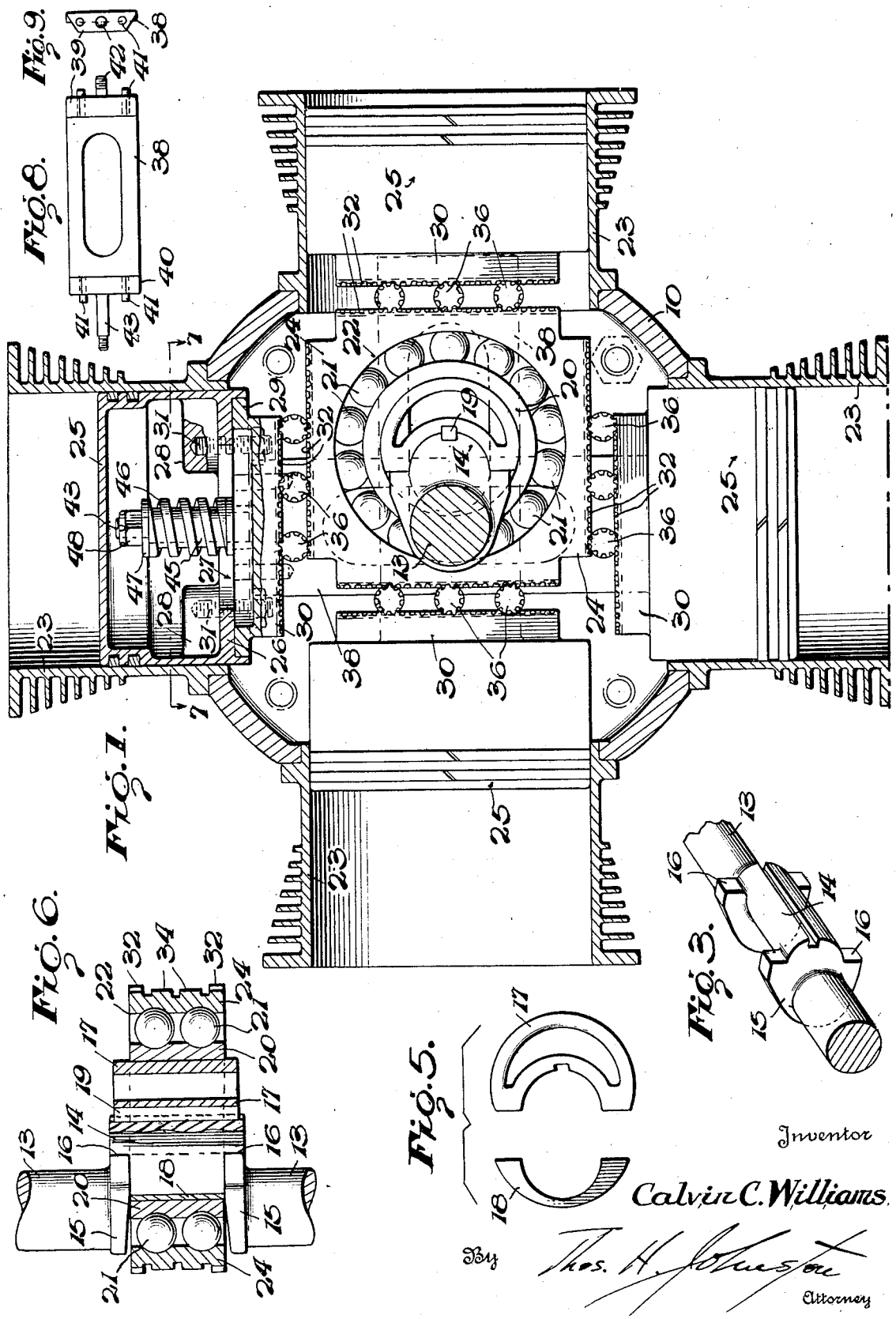

2,312,057

UNITED STATES PATENT OFFICE 2,312,057

MECHANICAL MOVEMENT

Calvin C. Williams, Philadelphia, Pa.

Application October 27, 1941, Serial No. 416,712

20 Claims. (Cl. 74—49)

This invention relates to an improved mechanical movement.

The invention is especially applicable to internal combustion engines of radial design and will be so described. However, the invention is also equally applicable to pumps, meters and other adaptations and I do not, therefore, wish to be limited in this regard.

As is well known, radial engines have demonstrated a peculiar adaptability to aviation. A main handicap, however, has resided in the overall diameter required for given horse power with consequent head resistance offered by the engine as a whole to the flight of aircraft. A further main handicap of the conventional radial engine has resided in the excessive weight of the engine in proportion to the horse power generated.

It is therefore an object of the present invention to provide a mechanical movement adapted to engine construction wherein, for given horse power, the engine will be appreciably less in over-all diameter, as compared with a conventional radial motor of the same horse power, whereby the head resistance of the engine to the flight of aircraft will be not only appreciably reduced but also, the weight of the engine will be appreciably reduced as well.

A further object of the invention is to provide a mechanical movement embodying a crank shaft having a crank pin of short throw for given horse power, and wherein, to gain said horse power, other factors being constant, the throw of the crank pin will be increased to an effective throw substantially double that of the pin itself without a corresponding increase in the over-all diameter of the engine such as would be expected in conjunction with an engine using conventional connecting rods and wrist pins.

Another object of the invention, in conjunction with the foregoing, is to provide a mechanical movement embodying the use of an eccentric on the crank pin for increasing the effective throw thereof, and wherein the eccentric bearing employed may be installed by slipping it along the crank shaft and over the crank, after which the eccentric may be assembled in position within the bearing about the crank pin.

A further object of the invention is to provide a mechanical movement wherein, as compared with conventional practice, short pistons will be employed in relation to cylinder bore, thus permitting the use of shorter cylinders with consequent reduction of over-all diameter of the engine, and wherein, among other factors, the use of short pistons will be made possible through the novel rigid coupling and support provided between opposed pistons of a pair so that the pistons may have an extreme inward travel into the crank case without canting of the pistons or undue friction under explosive force such as would be experienced in connection with conventional designs employing connecting rods and wrist pins.

Still another object of the invention in connection with that immediately preceding, is to provide a mechanical movement wherein the cylinders and the collar of the eccentric bearing employed will be so fashioned that, upon the outward throw of any one piston, a portion of the collar may move into the inner end of the cylinder for said piston, whereby to accomplish the outward stroke of the piston notwithstanding the shortness thereof, as previously mentioned, and whereby to also permit positioning of the cylinders radially closer to the crank shaft and cut down over-all diameter of the engine.

A further object of the invention is to provide a mechanical movement wherein the pistons will be provided with detachable end plates, wherein the coupling links between pairs of opposed pistons will be connected to said end plates, and wherein novel anti-friction devices will be provided between said end plates and the collar of the eccentric bearing for minimizing mechanical side thrust on the pistons.

And the invention seeks, as a still further object, to provide a mechanical movement wherein means will be provided for automatically taking up wear between the end plates, anti-friction devices and bearing collar and preventing looseness or play between said parts.

Other and incidental objects of the invention will appear during the course of the following description and in the drawings:

Figure 1 is a transverse vertical section through my improved mechanical movement at a right angle to the crank shaft.

Figure 2 is a vertical section in the plane of the crank shaft.

Figure 3 is a detail perspective view of the crank of the crank shaft.

Figure 4 is a detail section showing the relation of the crank pin to the crank shaft, the eccentric employed being seen in dotted lines.

Figure 5 is a detail end elevation of the eccentric, the mating parts being separated.

Figure 6 is a detail section showing the eccentric assembled upon the crank pin.

Figure 7 is a horizontal section on the line 7—7 of Figure 1.

Figure 8 is a detail side elevation of one of the links.

Figure 9 is an end view of the link seen in Figure 8.

Figure 10 is an enlarged detail section showing a typical pair of confronting faces of one of the piston end plates and the collar of the eccentric bearing.

Figure 11 is an enlarged detail elevation of one of the rollers employed between the parts of Figure 10.

Figure 12 is a fragmentary detail elevation showing a modified form of anti-friction means which may be employed in lieu of the rollers of Figure 11.

Figure 13 is a detail transverse section through the modification of Figure 12.

Figure 14 is a detail horizontal section through the modification of Figure 12.

In carrying the invention into effect, I employ a crank case 10 having detachable end plates 11 provided with bearings 12, and journaled through said bearings is a crank shaft 13.

As best seen in Figures 3 and 4 of the drawings, the crank shaft 13 is provided with a pin 14 having cheeks 15 each provided with a pair of flat shoulders 16 aligned diametrically of the pin. Furthermore, as will be observed, the cross sectional area of the shaft overlaps a portion of the cross sectional area of the pin at the cheeks 15, which construction tends toward rigidity as well as ease of manufacture.

Fixed to the crank pin 14 is an eccentric which, as best seen in Figure 5, is composed of complemental sections 17 and 18. The section 17 may be of skeleton construction, as shown, and is longer than the section 18 to rest at its ends against the shoulders 16 of the cheeks 15, being secured to the pin by a key 19. The section 18 of the eccentric is shaped to fit between the cheeks 15 and rest at its longitudinal edges against the longitudinal edges of the section 17. As will be perceived, the shoulders 16 of the cheeks 15 will rigidly support the section 17 against canting stress while the section 18 will be rigidly limited against movement around the pin 14 by the longitudinal edges of the section 17. A thoroughly rigid mounting for the eccentric is thus provided.

Surrounding the eccentric to coact therewith is a bearing shown in the present instance as a ball bearing but, of course, rollers may be employed if so desired. This bearing includes an inner ring 20 which more or less snugly fits about the eccentric to maintain the sections 17 and 18 thereof in assembled relation and forms a race for a series of balls 21. Surrounding the series of balls 21 to form an outer race therefor is a collar 22, the parts 20, 21 and 22 being assembled as a unit.

It is now to be noted that the throw of the crank pin 14 is relatively short for any given horse power for which the engine may be designed. Say, for instance, that the throw of the crank pin is an inch. Such a design will permit the use of an eccentric bearing composed of the parts 20, 21 and 22 wherein the inner ring 20 of the bearing will be of an internal diameter such that the ring may be slipped along the shaft 13 and over the combined major radial dimension of either of the cheeks 15 and the crank pin 14. Thus, the bearing may be assembled as a unit about the crank pin, after which the section 18 of the eccentric may be inserted into the ring and installed between the cheeks 15, when the section 17 of the eccentric may be inserted into the ring and installed to coact with the shoulders 16. In the instance given, the eccentric may be designed to increase the effective throw of the crank pin an inch so that the throw of the pin will thereby be doubled to impart a two-inch stroke to the collar 22. Thus, even though the throw of the crank pin itself is short for the rated horse power, such horse power is attained, other factors being consonant, through the increase in the effective throw provided by the eccentric for the pin. In this connection, it is to be noted that any increase in the throw of the crank pin of a conventional radial engine using connecting rods and wrist pins entails a responsive increase in the over-all diameter of the engine. In the present instance, however, such expected increase in over-all diameter is avoided through the use of the eccentric on the crank pin as well as other factors, as will later appear.

Fixed to the crank case 10 is a plurality of radial cylinders 23. Any suitable even number of cylinders may be employed but in the present instance I have shown the use of four cylinders evenly spaced about the crank case. The collar 22 of the eccentric bearing is accordingly shown as substantially rectangular in shape and cut away at its corners to provide a series of four heads 24 which are each of a length considerably less than the diameter of the cylinders 23 respectively and are straight at their outer edges. As will be understood, for any increase or decrease in the number of cylinders, the collar 22 will be provided with a like number of the heads 24, one for each cylinder.

Reciprocable in the cylinders 23 are pistons 25. These pistons are short in relation to the bore of the cylinders. For instance, in a conventional radial engine using connecting rods and wrist pins, the pistons are of a length about equal to the bore of the cylinders to sustain the side thrust created by the changing angularity of the connecting rods. Also, for such reason, the pistons may not travel out of the inner ends of the cylinders any appreciable distance as, otherwise, the pistons would cock and wedge in the cylinders. In the present instance, however, it has been found that, due to the rigid coupling of the pistons as will be later explained, the pistons may be made appreciably shorter than the bore of the cylinders, and consequently, as will also later appear, the cylinders may also be made appreciably shorter for given horse power.

Near their inner ends, the pistons 25 are provided with internal flanges 26 shaped, as seen in Figure 7, to define central elongated openings 27, and rising from said flanges are bosses 28. Abutting said flanges are end plates 29 provided diametrically at their outer sides with raised heads 30 corresponding to and confronting the heads 24 of the bearing collar 22, and engaged with said bosses are studs 31 detachably securing the end plates in position.

As shown in Figures 1 and 10 of the drawings, each pair of confronting heads 24 and 30 is provided at the outer margins thereof with racks 32 medially between which the heads are formed with opposite longitudinal grooves 33 defining pairs of smooth surfaces 34 at opposite sides of said grooves, and disposed between the heads to coact with said surfaces are antifriction rollers 35. Although the number may be varied, preferably three of the rollers are employed between each pair of heads 24 and 30 and, as best seen in Figure 11, these rollers are provided at their ends with pinions 36 to coact with the racks 32. Thus, as the bearing collar 22 is shifted rectilinearally, the rollers will be positively caused to roll substantially half the length of the heads therebetween. As brought out in Figure 11, the rollers are grooved medially and snapped into said grooves are removable retaining rings 37 which are more or less freely accommodated in the grooves 33 for limiting the rollers against endwise movement.

Coupling opposed pistons of the pistons 25 in pairs are flat links 38 apertured longitudinally to freely straddle the crank shaft 13. These links are relatively wide and, as shown in Figures 8 and 9 of the drawings, are provided at corresponding ends thereof with lateral flanges 39 while at opposite corresponding ends of the links are like flanges 40. Rising from each of the flanges is a pair of pins 41, and rising from the flange 39 of each link is a short stud 42 while from the flange 40 of each link rises a long stud 43, the studs being disposed between the pairs of pins. As the mounting of the pairs of links is identical, the construction has been particularly shown in Figure 2 of the drawings in connection with the vertically disposed pair of links only and will be so described in conjunction with a single pair of pistons.

Referring to Figure 2, the outermost vertically disposed pair of links 38 is particularly shown as typical. As will be observed, the short studs 42 of said links extend through the end plate 29 of the lower piston 25 so that the flanges 39 rest flat thereagainst, the adjacent pins 41 being snugly received through the plate, and securing said studs are nuts 44. The flanges 39 will thus coact with the plate throughout wide areas for firmly positioning the links to extend at a right angle to the plate. Fixed to the end plate 29 of the upper piston 25 near the ends of the opening 27 of the piston flange 26 are upstanding parallel sleeves 45 which are received within the piston. These sleeves snugly but slidably receive the long studs 43 of the pair of links while the pins 41 at the adjacent ends of the links are likewise snugly but slidably received through the plate. Surrounding the sleeves 45 are springs 46 at the outer ends of which are washers 47 which abut nuts 48 screwed on the studs.

As will be noted, the flanges 40 of the vertical links of Figure 2, now being described as typical, are spaced somewhat from the end plate 29 of the upper piston 25 so that the springs 45 may function to at all times resiliently force the pistons of the pair toward each other and tightly confine the associated rollers 35 between the heads 30 of the end plates 29 of said pistons and the confronting heads 24 of the bearing collar 22. Play between the parts will thus be eliminated while any wear which may develop will be taken up by the springs. It is further to be noted that the pins 41 will secure the pair of links 38 against twisting movement as the nuts 44 and 48 are tightened and will lock said links in parallel relation so that the vertical links may abut the horizontal links at the region of the crank shaft to provide mutual support for each other medially of the links. As will be perceived, the links may be arranged in position and installed upon the end plates 29 before said end plates are attached to the piston 25.

Referring further to the typical pair of pistons 25 and vertical links 38 particularly shown in Figure 2, attention is now directed to the fact that the lower piston will at all times be held in square relation to the links by the long bearing areas of the flanges 39 contacting the end plate 29 of said piston. Similarly, the upper piston will at all times be held in square relation to the links by the long bearing areas of the studs 43 of said links contacting the sleeves 45. Thus, the pistons may not cant under the stress of explosive force thereon and it accordingly becomes possible to not only make the pistons shorter than under conventional design, as previously noted, but also, to permit a longer inward stroke of the pistons than conventionally practiced. These features, in conjunction with the saving effected in over-all diameter through the use of a crank pin of short throw and an eccentric on the pin, also make it possible, under the present invention, to fashion the cylinders shorter than conventionally practiced. In fact, for given horse power, it has been found that a saving of about 25% in over-all diameter may be effected as compared with a conventional radial engine of like horse power using connecting rods and wrist pins. Loss of displacement is avoided by the extreme inward throw of the pistons. As seen at the left of Figure 1 of the drawings, the pistons may move inwardly until only the outer end margins of the pistons remain in the cylinders so that the cylinders cover but slightly more than the area of the piston rings, the pistons being unable to cant or wedge by reason of the rigid support therefor provided by the connecting links 38 while side drag upon the pistons is reduced to a minimum by the rollers 35. A corresponding outward stroke of the pistons is permitted through the provision of the heads 24 on the bearing collar 22. As previously noted, these heads are each shorter than the bore of the cylinders respectively so that, as seen at the right of Figure 1 of the drawings, the corresponding head may move into the inner end of the confronting cylinder as the piston in said cylinder moves outwardly. Furthermore, this feature permits the cylinders to be set radialy closer to the crank shaft with a corresponding saving in over-all diameter than would otherwise be possilbe.

In Figures 12, 13 and 14 of the drawings I have shown a modified form of anti-friction means between the eccentric bearing collar and the pistons. A typical head of the collar is indicated at 49, this head corresponding to any one of the heads 24. A typical end plate of one of the pistons is indicated at 50, this end plate corresponding to any one of the end plates 29 and being provided with a head 51 like any one of the heads 30.

Formed in the heads 49 and 51 are pairs of longitudinal grooves 52 between each pair of which is provided a channel in which is fixed a rack 53. Disposed between the heads is a ball retainer split longitudinally into companion sections 54 and carried by each section is a series of balls 55, the several balls being received in the grooves 52 to sustain the thrust between the heads 49 and 51. Freely accommodated at the junction between the sections 54 of the ball retainer are pinions 56 having trunnions 57 journaled by said sections for supporting the pinions to coact with the racks 53. The ball retainer will thus be driven by the pinions to precisely define the movement of the balls 55 as the head 49 shifts relative to the head 51.

Having thus described my invention, what I claim is:

1. A mechanical movement including a casing, a crank shaft journaled thereon and provided with a crank pin having cheeks, an eccentric carried by the pin for increasing the effective throw thereof and locked by the cheeks against movement around the pin, opposed cylinders carried by the casing, coupled pistons reciprocable in said cylinders, and means interposed between the inner ends of the pistons and said eccentric for rotating the crank shaft as the pistons reciprocate.

2. A mechanical movement including a casing, a crank shaft journaled thereon and provided with a crank pin, an eccentric carried by the pin for increasing the effective throw thereof and including a section locked to the pin and a mating section locked against movement around the pin by the former section, a bearing surrounding the eccentric to coact therewith and including a collar, opposed cylinders carried by the casing, pistons reciprocable in said cylinders, and means coupling the pistons to operatively coact with said collar for rotating the crank shaft as the pistons reciprocate.

3. A mechanical movement including a casing, a crank shaft journaled thereon and provided with a crank pin, an eccentric carried by the pin for increasing the effective throw thereof, opposed cylinders carried by the casing, coupled pistons reciprocable in said cylinders and provided with detachable end plates mounted in the inner ends of the pistons, and means interposed between said plates and the eccentric for rotating the crank shaft as the pistons reciprocate.

4. A mechanical movement including a casing, a crank shaft journaled thereon and provided with a crank pin, an eccentric carried by the pin for increasing the effective throw thereof, opposed cylinders carried by the casing, pistons reciprocable in said cylinders and provided with detachable end plates mounted in the inner ends of the pistons, means interposed between said end plates and the eccentric for rotating the crank shaft as the pistons reciprocate, and means extending between said end plates and coupling the pistons to coact with the former means.

5. A mechanical movement including a casing, a crank shaft journaled thereon and provided with a crank pin, an eccentric carried by the pin for increasing the effective throw thereof, opposed cylinders carried by the casing, pistons reciprocable in said cylinders, means interposed between the inner ends of the pistons and said eccentric for rotating the crank shaft as the pistons reciprocate, means coupling the pistons to coact with the former means, and yieldable means carried by said coupling means and urging the pistons toward each other into engagement with said first mentioned means for automatically taking up looseness between the parts.

6. A mechanical movement including a casing, a crank shaft journaled thereon and provided with a crank pin, an eccentric carried by the pin for increasing the effective throw thereof, a bearing surrounding the eccentric to coact therewith, opposed cylinders carried by the casing, pistons reciprocable in said cylinders, means coupling the pistons to operatively coact with said bearing for rotating the crank shaft as the pistons reciprocate, and means carried by said coupling means within one of the pistons to act on said coupling means for automatically taking up looseness between the parts.

7. A mechanical movement including a casing, a crank shaft journaled thereon and provided with a crank pin, an eccentric carried by the pin for increasing the effective throw thereof, opposed cylinders carried by the casing, a bearing surrounding the eccentric to coact therewith and having portions movable into the inner ends of the cylinders to accommodate the effective throw of the pin, and coupled pistons reciprocable in said cylinders and provided at their inner ends with end plates mounted therein to operatively coact with said portions of the bearing for rotating the crank shaft as the pistons reciprocate.

8. A mechanical movement including a casing, a crank shaft journaled thereon and provided with a crank pin, an eccentric carried by the pin for increasing the effective throw thereof, a bearing surrounding the eccentric to coact therewith, opposed cylinders carried by the casing, pistons reciprocable in said cylinders and provided with end plates mounted in the inner ends of the pistons, anti-friction means interposed between said end plates and the bearing and including elements for positively actuating said means as the bearing moves angularly relative to the travel of the pistons, and means coupling the pistons to coact with said means for rotating the crank shaft as the pistons reciprocate.

9. A mechanical movement including a casing, a crank shaft journaled thereon and provided with a crank pin, an eccentric carried by the pin for increasing the effective throw thereof, a bearing surrounding the eccentric to coact therewith and provided with racks, opposed cylinders carried by the casing, pistons reciprocable in said cylinders and having end plates mounted in the inner ends thereof and provided with racks, antifriction rollers interposed between the end plates and said bearing and provided with pinions to coact with said racks for positively revolving the rollers as the bearing shifts angularly relative to the travel of the pistons, and means coupling the pistons to coact with said rollers for rotating the crank shaft as the pistons reciprocate.

10. A mechanical movement including a casing, a crank shaft journaled thereon and provided with a crank pin, an eccentric carried by the pin for increasing the effective throw thereof, a bearing surrounding the eccentric and provided with racks, opposed cylinders carried by the casing, pistons reciprocable in said cylinders and having end plates mounted in the inner ends thereof and provided with racks, anti-friction balls interposed between the end plates and said bearing, a retainer for said balls, pinions journaled upon said retainer to coact with said racks for positively shifting the retainer and revolving the balls as the bearing shifts angularly relative to the travel of the pistons, and means coupling the pistons to coact with the balls for rotating the crank shaft as the pistons reciprocate.

11. A mechanical movement including a casing, a crank shaft journaled thereon and provided with a crank pin, an eccentric carried by the pin for increasing the effective throw thereof, a bearing surrounding the eccentric, opposed cylinders carried by the casing, pistons reciprocable in said cylinders, and means yieldably coupling the pistons to clamp said bearing therebetween and coact with said bearing for rotating the crank shaft as the pitsons reciprocate but rigidly supporting the pistons against canting movement in the cylinders.

12. A mechanical movement including a casing, a crank shaft journaled thereon and provided with a crank pin, an eccentric carried by the pin for increasing the effective throw thereof, opposed cylinders carried by the casing, pistons reciprocable in said cylinders, removable end plates carried by the pistons, links solidly fixed at corresponding ends thereof to the end plate of one of said pistons and provided at their opposite corresponding ends with studs, sleeves fixed to the end plate of the other of said pistons and slidably receiving said studs to coact therewith in conjunction with said links for rigidly supporting the pistons against canting movement in the cylinders, and springs associated with said studs for urging the end plates to operatively coact with said eccentric for rotating the crank shaft as the pistons reciprocate.

13. A mechanical movement including a casing, a crank shaft journaled thereon and provided with a crank pin, a bearing having an inner ring slipped over the crank shaft to surround said pin, an eccentric including a section inserted into said ring to engage the pin at one side thereof and a mating section inserted into the ring to engage the pin at its opposite side and coact with the former section to engage the ring throughout the inner periphery thereof, opposed cylinders carried by the casing, and coupled pistons reciprocable in said cylinders to operatively coact with said bearing for rotating the crank shaft as the pistons reciprocate.

14. A mechanical movement including a casing, a crank shaft journaled thereon and provided with a crank pin having cheeks formed with lateral shoulders, a bearing having an inner ring slipped over the crank shaft to surround said pin, an eccentric including a short section inserted into said ring between the cheeks to engage the pin at one side thereof and a mating long section inserted into the ring to rest at its ends upon said shoulders engaging the pin at its opposite side and coacting with the former section of the eccentric to engage the ring throughout the inner periphery thereof, opposed cylinders carried by the casing, and coupled pistons reciprocable in said cylinders to operatively coact with said bearing for rotating the crank shaft as the pistons reciprocate.

15. A mechanical movement including a casing, a crank shaft journaled thereon and provided with a crank pin, an eccentric carried by the pin for increasing the effective throw thereof, opposed cylinders carried by the casing, a bearing surrounding the eccentric to coact therewith and including a collar having reduced heads movable into the cylinders to accommodate the effective throw of the crank pin, pistons reciprocable in said cylinders and provided with end plates having heads confronting the former heads, anti-friction devices interposed between said heads, and means coupling the pistons to coact with said anti-friction devices for rotating the crank shaft as the pistons reciprocate.

16. A mechanical movement including a casing, a crank shaft journaled thereon and provided with a crank pin, an eccentric carried by the pin for increasing the effective throw thereof, opposed cylinders carried by the casing, a bearing surrounding the eccentric to coact therewith and including a collar having reduced heads movable into the cylinders to accommodate the effective throw of the crank pin, pistons reciprocable in said cylinders and provided with end plates having heads confronting the former heads, anti-friction devices interposed between said heads, means coupling the pistons to coact with said anti-friction devices for rotating the crank shaft as the pistons reciprocate, and yieldable means carried by said coupling means for automatically taking up looseness between the parts.

17. A mechanical movement including a casing, a crank shaft journaled thereon and provided with a crank pin, an eccentric carried by the pin for increasing the effective throw thereof, opposed cylinders carried by the casing, pistons reciprocable in said cylinders, means yieldably coupling the pistons to operatively coact with said eccentric for rotating the crank shaft as the pistons reciprocate but rigidly supporting the pistons against canting movement in the cylinders, and end plates detachably connected to the inner ends of the pistons and mounting said coupling means.

18. In a mechanical movement, the combination of a casing having opposed cylinders thereon and journaling a crank shaft having a crank pin of short throw in relation to given horse power displacement of said cylinders, pistons reciprocable in said cylinders and of short length in relation to the bore of said cylinders, means coupling the pistons and rigidly supporting the same against canting movement in the cylinders to permit an elongated stroke of the pistons, an eccentric carried by the crank pin for increasing the effective throw thereof and elongating the stroke of the pistons, and means interposed between the eccentric and said pistons for rotating the crank shaft as the pistons reciprocate.

19. In a mechanical movement, the combination of a casing having opposed cylinders thereon and journaling a crank shaft having a crank pin of short throw in relation to given horse power displacement of said cylinders, pistons reciprocable in said cylinders and of short length in relation to the bore of said cylinders, means coupling the pistons and rigidly supporting the same against canting movement in the cylinders to permit an elongated stroke of said pistons, an eccentric carried by said crank pin for increasing the effective throw thereof and elongating the throw of the pistons, and a bearing surrounding said eccentric to coact therewith and including a collar having portions to operatively coact with the pistons for rotating the crank shaft as the pistons reciprocate and receivable in the inner ends of the cylinders to accommodate the effective throw of the crank pin.

20. In a mechanical movement, the combination of a casing having opposed cylinders thereon of short length in relation to given horse power displacement of said cylinders, a crank shaft journaled on the casing and having a crank pin of short throw in relation to said horse power displacement, pistons reciprocable in said cylinders and of short length in relation to the bore of the cylinders, means coupling the pistons and rigidly supporting the same against canting movement in the cylinders to permit an elongated stroke of said pistons, an eccentric carried by said crank pin to coact therewith for increasing the effective throw of the pin and elongating the stroke of the pistons, and a bearing surrounding said eccentric and including a collar having portions to operatively coact with the pistons for rotating the crank shaft as the pistons reciprocate and receivable in the inner ends of the cylinders to accommodate the effective throw of the crank pin.

CALVIN C. WILLIAMS.